US005967647A

United States Patent [19]

Eichler

[11] Patent Number: 5,967,647

[45] Date of Patent: Oct. 19, 1999

[54] HEADLIGHT FOR A VEHICLE, ESPECIALLY A MOTOR VEHICLE

[75] Inventor: Heike Eichler, Reutlingen, Germany

[73] Assignee: Robert Bosch GmbH, Stuttgart, Germany

[21] Appl. No.: 09/010,669

[22] Filed: Jan. 22, 1998

[30] Foreign Application Priority Data

Feb. 6, 1997 [DE] Germany .......................... 197 04 467

[51] Int. Cl.$^{6}$ ........................................ B60Q 1/04

[52] U.S. Cl. ........................ 362/304; 362/517; 362/518; 362/299

[58] Field of Search .............................. 362/298, 299, 362/302, 304, 346, 348, 510, 516, 517, 518, 538, 539

[56] References Cited

U.S. PATENT DOCUMENTS

| | | | |
|---|---|---|---|
| 1,457,565 | 6/1923 | Warrick | 362/510 |
| 1,883,360 | 10/1932 | Fortney | 362/510 |
| 2,338,901 | 1/1944 | Chiti | 362/539 |
| 4,945,455 | 7/1990 | Akizuki | 362/298 |

FOREIGN PATENT DOCUMENTS 195 19 872 A1 12/1996 Germany .

*Primary Examiner*—Y. Quach
*Attorney, Agent, or Firm*—Michael J. Striker

[57] ABSTRACT

The headlight has a light source (12) which is mounted in a main reflector (10) by which a convergent light beam is reflected, which passes through a lens (16). An additional reflector (22) is arranged surrounding the main reflector (10) between the main reflector (10) and the lens (16), by which light not captured by the main reflector (10) is reflected as an additional light beam with horizontal scattering. The light beam passing through the lens (16) forms a low beam, by which a predetermined low beam light distribution is provided with an upper light-dark boundary. The additional light beam produces an additional uniform light distribution, which overlaps the low-beam light distribution. The headlight illuminates a larger surface than the surface of the lens (16) because of the additional reflector (22) surrounding the main reflector (10) and the lens (16) so that it causes no glare or blinding. The headlight can have a cover disk with a smooth surface without optical elements and thus a uniform appearance.

11 Claims, 6 Drawing Sheets

HEADLIGHT FOR A VEHICLE, ESPECIALLY A MOTOR VEHICLE

BACKGROUND OF THE INVENTION

The present invention relates to a headlight for a vehicle and especially to a headlight for a motor vehicle.

A known headlight of a type, on which the present invention is based, is described in German Patent Application DE 195 19 872 A1. This headlight has a light source and a reflector, by which light from the light source is reflected as a convergent light beam. The headlight also has an additional reflector, which is arranged between the reflector and the lens, and light issuing from the light source is reflected also by the additional reflector as an additional light beam. The additional reflector is assembled laterally beside the reflector and has a parabolic shape, so that the additional light beam reflected by it extends approximately parallel to its optic axis, which at least approximately coincides with the optic axis of the main reflector. The additional light beam passes through a light permeable disk or pane, on which a lens is mounted, and is scattered horizontally by optical elements of the disk. The additional light beam produces a light intensity distribution which overlaps the light intensity distribution produced by the light beam passing through the lens. When the headlight is observed with the light source turned on not only its lens is illuminated through which the light beam passes, but also the additional reflector, so that in as much as a larger surface is illuminated than the surface of the lens, the headlight is not perceived to be subjectively as blinding. It is disadvantageous in this headlight that the disk is required to have optical elements to produce the horizontally scattered additional light beam and this increases the manufacture and assembly costs for the headlight. Furthermore the disk is not completely transparent in the vicinity of the headlight, so that the headlight has no uniform appearance with the light source turned off.

SUMMARY OF THE INVENTION

It is an object of the present invention to provide a headlight for a vehicle, which does not have the above described disadvantages.

This object, and others which will become more apparent hereinafter, is attained in a headlight for a vehicle comprising a light source for producing light; a main reflector, by which one portion of the light issuing from the light source is reflected as a convergent light beam; a lens through which the convergent light beam passes; at least one additional reflector that is arranged between the main reflector and the lens, which extends around at least a portion of the periphery of the main reflector and by which another portion of the light from the light source not captured by the main reflector is reflected to form at least one additional light beam which does not pass through the lens and which is propagated from the light source with horizontal scattering; and a light permeable disk covering the light outlet opening of the headlight.

According to the invention the at least one additional reflector is formed in such a way that the other portion of the light from the light source is reflected by it as the at least one additional light beam and the cover disk does not require and does not have optical elements, e.g. optical elements for deflecting light passing through it.

The headlight for vehicle according to the invention has the advantage that no cover disk with optical elements is required for the production of the horizontally scattered additional light beam, since it is already reflected by the at least one additional reflector with horizontal scattering. Thus a smooth disk or pane without optical elements can be used as the cover disk for the headlight, so that the headlight can have a uniform appearance when the light source is turned off.

Advantageous features and embodiments of the headlight according to the invention are included in the dependent claims appended hereinbelow.

In a preferred embodiment of the invention the at least one additional reflector has a reflective surface provided with a plurality of scattering sections, advantageously concave depressions and/or convex protrusion of the same or varying dimensions, by which the other portion of the light from the light source falling on the reflective surface is horizontally scattered. Because of that, a sufficient horizontal scattering of the additional light beam and its propagation from the headlight can be attained with the additional reflector arranged comparatively far inside the headlight housing in a direction opposite to the light propagation direction.

In other preferred embodiments the at least one additional reflector has a reflective coating with a degree of reflection which is less than that of the main reflector, advantageously less than 0.9. In some embodiments the reflective coating or surface of the at least one additional reflector may be partially permeable and partially reflective so that the degree of reflection can be controlled. Because of these preferred features, the light intensity of the additional light beam can be adjusted or determined in a simple way by suitable selection of the degree of reflection and/or the light permeability of the reflective coating on the additional reflector, so that a driver of an on-coming vehicle or the like is not subject to blinding or glare.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
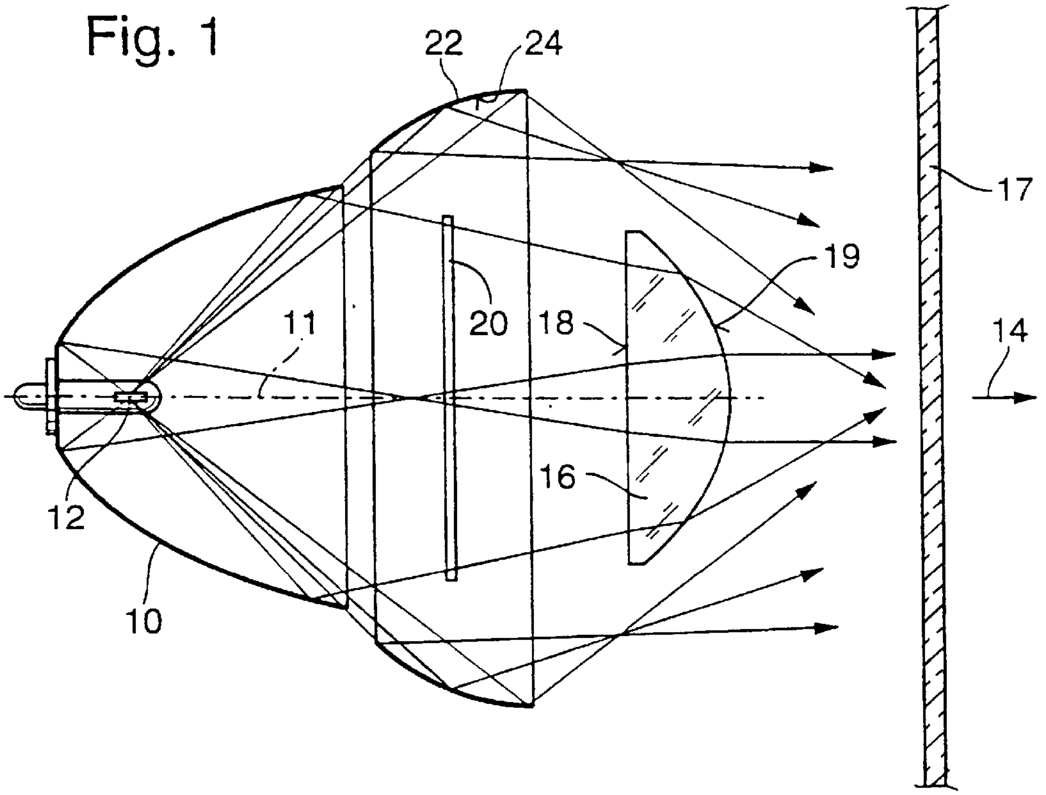
FIG. 1 is a diagrammatic horizontal longitudinal cross-sectional view through a headlight according to a first embodiment of the invention.

A headlight for a vehicle, especially a motor vehicle, which is shown in FIGS. 1 to 9, has a main reflector 10 and a light source 12, which is mounted in the vicinity of the peak of the reflector. The headlight produces low beam light and propagates a light beam with an upper light-dark boundary when operated. The light source 12 can be an incandescent lamp, a gas discharge lamp or another suitable lamp. Light from the light source 12 is reflected by the reflector as a convergent light beam. The main reflector 10 can have an ellipsoidal, ellipsoid-like or another, for example numerically determined, shape suitable to produce the convergent light beam. The convergent light beam reflected from the main reflector 10 passes through a lens 16 made of glass or plastic spaced from the main reflector 10 in the light propagation direction 14, so that it has the characteristics required for the low beam propagated from the headlight. The light outlet opening of the headlight is covered with a light permeable cover disk 17 made of glass or plastic which is smooth and has no optical elements, by which light passing through it is deflected. The main reflector 10 and the lens 16 can be arranged in an unshown housing, on which the cover disk 17 can be held. The main reflector 10 can be made of plastic or metal.

The lens 16 is a convergent lens and has, for example, a flat or plane side 18 closest to or facing the main reflector 10 and a convex curved side 19 furthest from or facing away from the main reflector 10, which can be spherical or nonspherical and which can be divided into several surface parts. A light impermeable stop or shield 20 can be provided between the main reflector 10 and the lens 16, which is arranged under the optic axis 11 of the main reflector 10. Only a part of the light beam reflected by the main reflector 10 can pass by the light stop or shield 20 so that the shape of the upper edge of the stop or shield 20 determines the shape of the resulting light-dark boundary of the light beam. Alternatively the light stop 20 can be omitted, when the shape of the main reflector 10 is designed so that the light beam reflected by it already has the required light-dark boundary.

Figure 10:
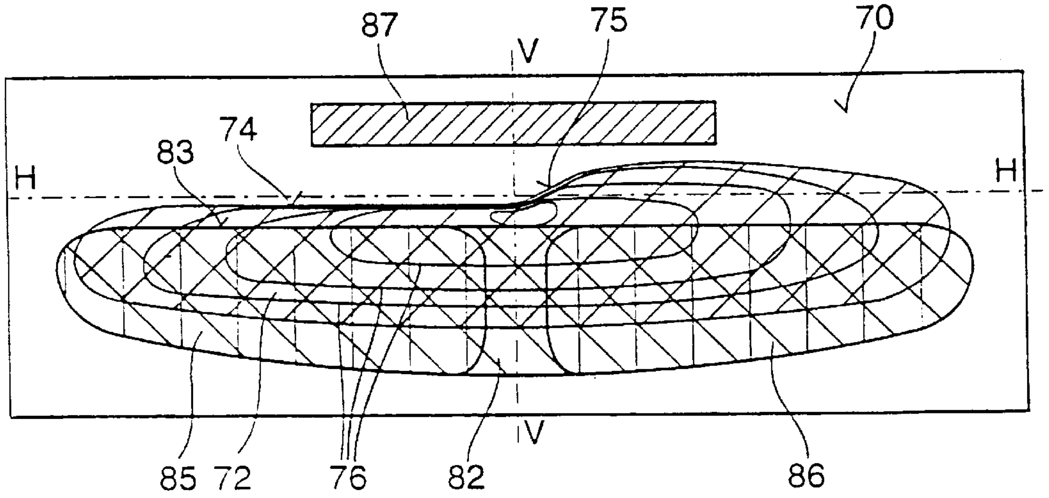
FIG. 10 is diagrammatic view of a light intensity distribution from a headlight according to the invention projected on a measuring screen spaced in front of the headlight.

A measuring screen 70 spaced from the headlight, which is shown in FIG. 10, is illuminated by light from the headlight. The measuring screen represents the projection of a road in front of the headlight. The vertical center plane of the measuring screen 70 is indicated with VV and its horizontal plane is indicated with HH. A region 72 of the screen 70 is illuminated by the light reflected by the main reflector 10 and passing through the lens 16. The region 72 is bounded above by a light-dark boundary, which has a horizontal portion 74 on the opposing traffic side, which means on the left side of the measuring screen 70 in the case of right-handed traffic and an at least partially higher portion 75 opposite to the horizontal portion 74, which means the right side of the screen. The higher portion 75 can rise continuously from the horizontal portion 74 or can be approximately horizontal. Several lines 76 of equal light intensity, the so-called isolux lines, are shown inside the region 72. The highest illumination intensity values present are in the vicinity of the vertical central plane VV of the measuring screen 70 and near the light-dark boundaries 74,75 and the light or illumination intensity decrease to the edges of the region 72.

At least one additional reflector 22 is arranged between the main reflector 10 and the lens 16, on which light from the light source 12 falls, which cannot be captured by the main reflector 10. This light from the light source 12 is reflected by the at least one additional reflector 22 as at least one additional light beam, which does not pass through the lens 16, however is propagated from the headlight through the cover disk 17. The additional light beam is reflected by the additional reflector 22 so that it is horizontally scattered. The additional light beam has a sufficiently strong horizontal scattering so that the additional reflector 22 appears to be illuminated from the outside of the headlight over a comparatively large angular range when the headlight is operated. The at least one additional reflector 22 can be made of plastic or metal.

A region 82 shown in FIG. 10 is illuminated by the at least one additional light beam. This region 82 at least partially overlaps the region 72 illuminated by the light beam passing through the lens 16. The region 82 is bounded above by a horizontal light-dark boundary 83, which is arranged under the light-dark boundary 74,75 bounding the region 72. The region 82 is illuminated by the additional light beam with a light intensity which is less than that illuminating the region 72 by the primary light beam. The region 82 can extend laterally beyond the region 72, when the additional light beam has more horizontal scattering than the primary light beam. The additional light beam produces a homogeneous intense light distribution with less light intensity than the primary light beam and thus does not influence or at least does not interfere with the primary light intensity distribution.

Alternatively several partial light beams can be reflected by the at least one additional reflector 22, which illuminate different regions of the measuring screen 70. For example, two partial additional light beams can be reflected, one of which, as shown with shaded lines in FIG. 10, illuminates a region 86 to the right of the vertical central plane VV and a region 85 to the left of the vertical central plane vv. Both regions 85 and 86 are bounded above by the horizontal light-dark boundary 83. Alternatively it can be provided that at least one partial additional light beam illuminates a region 87 on the measuring screen 70 shown in FIG. 10, which is spaced from and above the light-dark boundary 74,75 of the region 72. By illuminating the region 87 objects found there, such as highly mounted traffic signs, are sufficiently illuminated, without blinding the drivers of on-coming vehicles, since the zone between the region 87 and the light-dark boundary 74,75 is not illuminated. The region 82 and/or the regions 85,86 can be illuminated by one partial additional light beam and the region 87 can be illuminated by another partial additional light beam.

Figure 2:
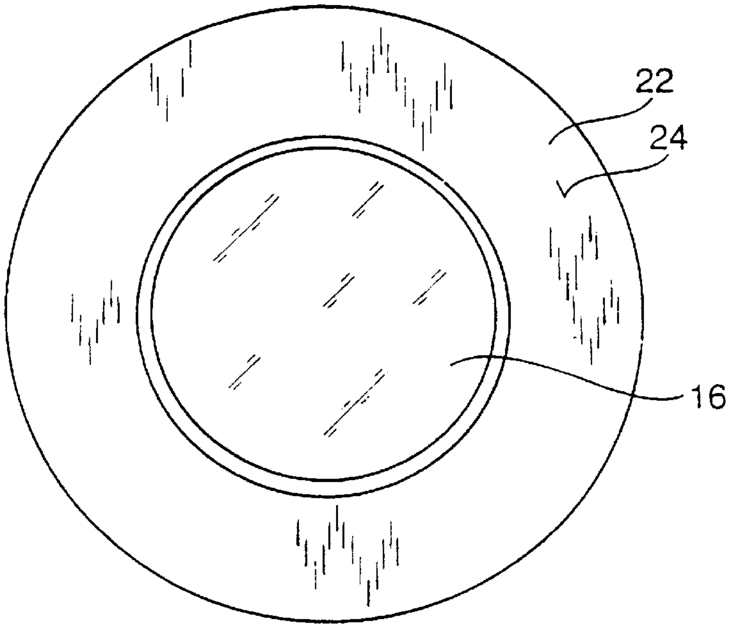
FIG. 2 is a front view of the headlight shown in FIG. 1.

The at least one additional reflector 22 can be shaped like a ring as shown in FIG. 1 and 2 and surround, i.e. extend around, the entire circumference of the main reflector 10. The additional reflector 22 has an opening corresponding to the cross-sectional shape of the main reflector 10, so that light reflected by the main reflector 10 can reach the lens unimpeded or without hindrance. The outer shape of the additional reflector 22 can be round as shown in FIG. 2 or can be another shape, such as a rectangular shape, according to choice. Also several separate additional reflectors in other embodiments can be arranged around the circumference of the main reflector 10, each of which extend around only a portion of the total circumference of the main reflector 10. Alternatively several additional reflectors 22 can be provided spaced from each other in the direction of the optic axis 11. Furthermore the additional reflector or reflectors 22 can extend only over a portion of the circumference of the main reflector 10 and for example are arranged only laterally besides or above and/or under the main reflector 10. The additional reflector 22 or reflectors can be connected to the main reflector 10 or also in one piece with it or can be haled in the housing of the headlight in an unshown manner. In the following several embodiments are illustrated, in which the structure of the main reflector 10 and the lens 16 is unchanged for these embodiments.

The additional reflector 22 is shown according to a first embodiment in FIGS. 1 and 2 and has a reflective surface 24, which is provided with a reflective coating and on which light from the light source 12 falls. The reflective surface 24 of the additional reflector is concave and light from the light source 12 is reflected by it as a convergent additional light beam in a horizontal longitudinal plane. The additional light beam extends at least approximately parallel to a vertical longitudinal plane. It is inclined downward relative to the optic axis 11, in so far as it illuminates region 82 and/or regions 85,86 of the measuring screen 70. It is inclined upward relative to the optic axis 11 in as much as it illuminates the region 87 of the measuring screen 70. The reflective surface 24 can, for example, have an at least approximately elliptical or ellipsoidal shape in a horizontal central plane containing the optic axis 11 and an at least approximately parabolic or parabola-like shape in the vertical central plane containing the optic axis 11. Alternatively the shape of the reflection surface 24 can be numerically determined so that light from the light source reflected by it is reflected with along a predetermined path and with a predetermined scatter. The light rays of the additional light beam cross each other in the horizontal longitudinal plane in the light propagation direction 14 toward the lens 16, so that the portion of the regions 82 and/or 87 or the region 86 to the right of the vertical central plane VV of the measuring screen 70 is illuminated by light reflected by the left half of the additional reflector, as observed in the light propagation direction 14, and the part of the regions 82 or 87 and/or the region 85 to the left of the vertical central plane VV of the measuring screen 70 is illuminated by light reflected from the right half of the additional reflector 22.

Figure 3:
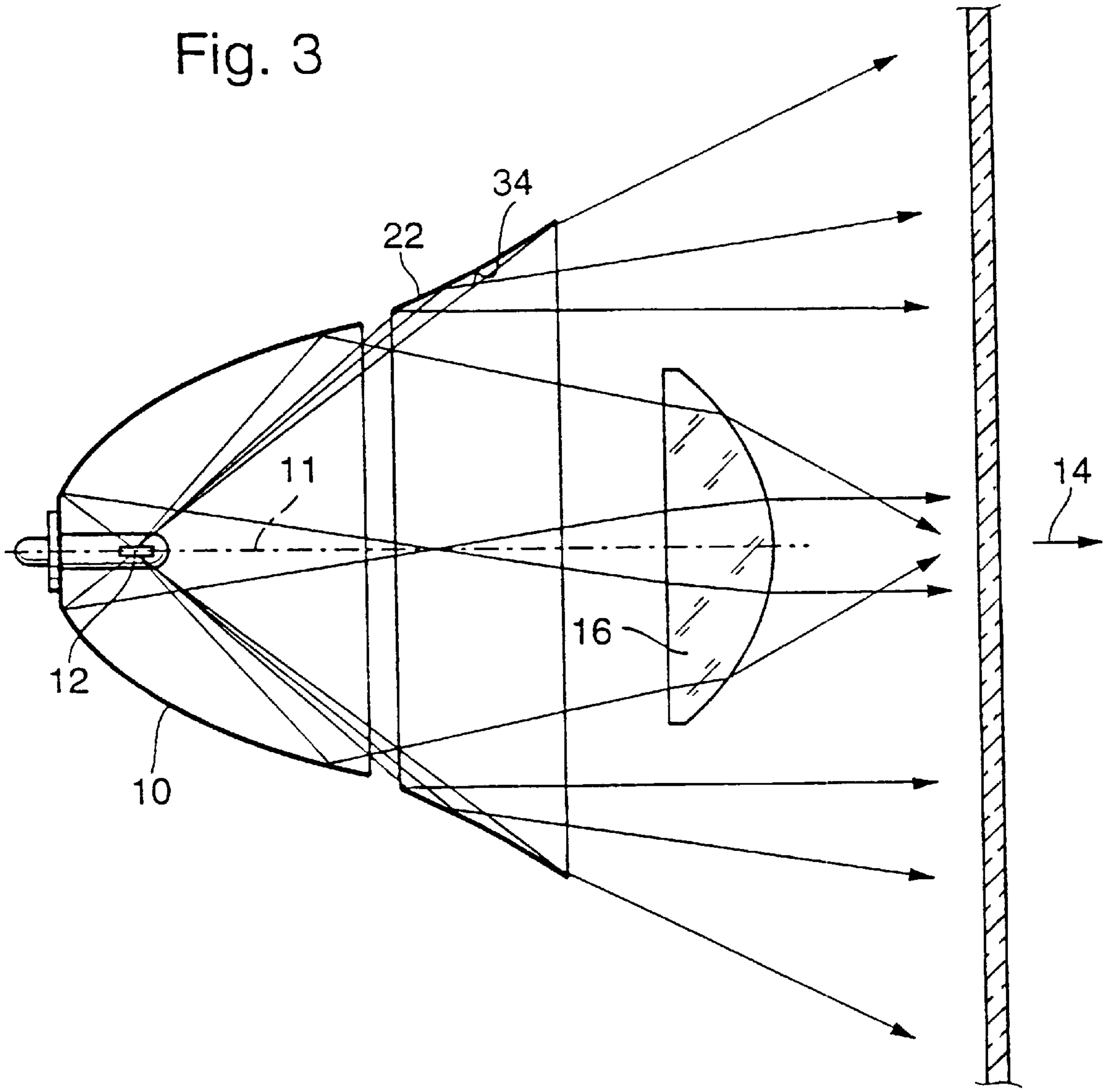
FIG. 3 is a diagrammatic horizontal longitudinal cross-sectional view through a headlight according to a second embodiment of the invention.

The additional reflector 22 according a second embodiment is shown in FIG. 3. In this second embodiment light form the light source 12 is reflected by the reflective surface 34 of the additional reflector 22 provided with the reflective coating as an additional light beam diverging in the horizontal longitudinal plane. The light rays of the additional light beam pass diverge from each other in the light propagation direction in the horizontal central plane. The additional light beam extends in the vertical longitudinal plane as already mentioned in connection with the first embodiment. The reflective surface 34 can be convex as shown in FIG. 3 or alternatively concave as in the first embodiment or at least approximately planar or flat. The reflective surface 34 can for example have an at least approximately hyperbolic or hyperbolic-like shape in the horizontal central plane containing the optic axis 11 and can have an at least approximately parabolic or parabolic-like shape in the vertical central plane. Alternatively the shape of the reflective surface can also be determined numerically so that the additional light beam is reflected by it with a predetermined direction and scatter. The left part of the regions 82 and/or 87 or the left region 85 is illuminated by light reflected from the left half of the additional reflector 22. The right part of the regions 82 and/or 87 or the right region 86 on the measuring screen 70 is illuminated by light reflected from the right half of the additional reflector 22.

Figure 4:
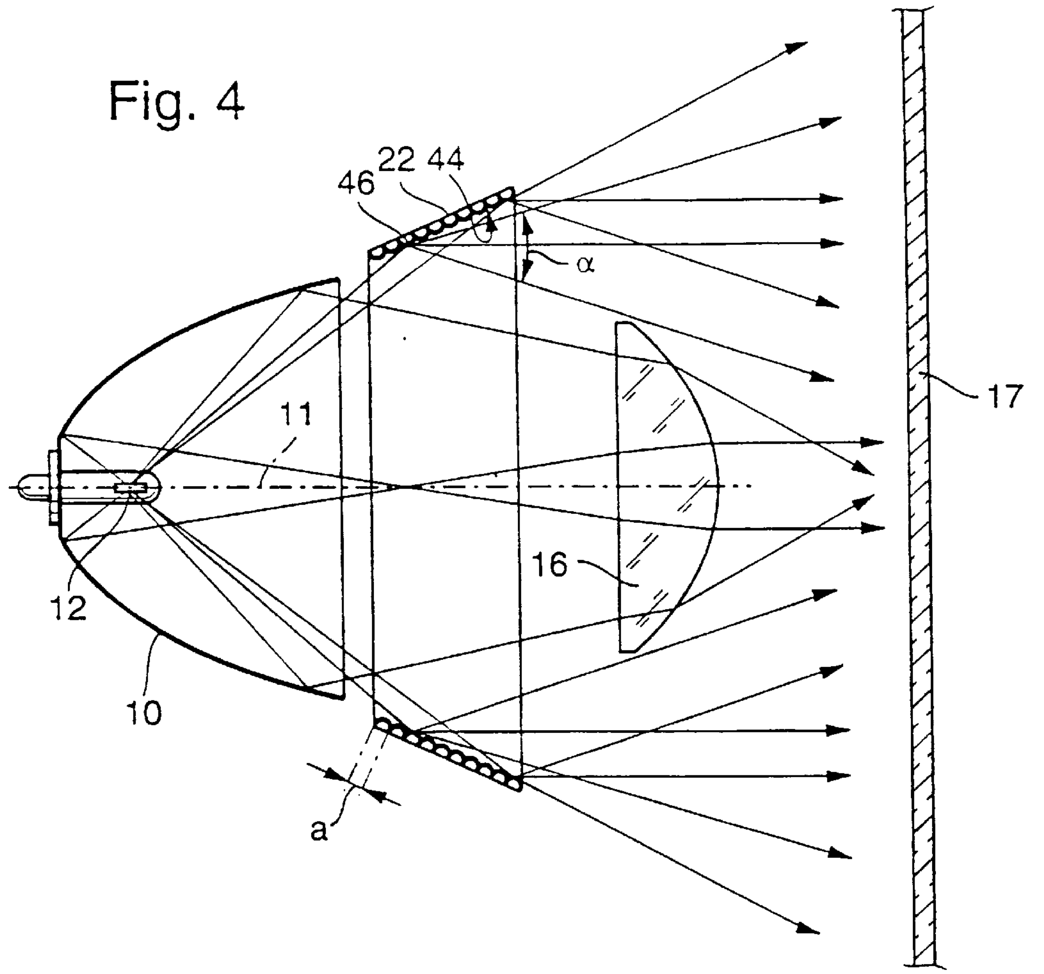
FIG. 4 is a diagrammatic horizontal longitudinal cross-sectional view through a headlight according to a third embodiment of the invention.

The additional reflector 22 is shown according to the third embodiment in FIG. 4. In this third embodiment the reflective surface 44 of the additional reflector 22 provided with a reflective coating can be concave, convex or flat in its basic shape. The reflective surface 44 is provided with overlapped scattering sections 46 with dimensions which are reduced in comparison to the dimensions of the additional reflector 22. The scattering sections 46 are formed as convex raised portions with spherical or nonspherical curvature, which protrude from the reflective surface 44, in the embodiment shown in FIG. 4. The convex scattering sections 46 can usually be arranged so that their extent a can be different or the same over the entire reflective surface 44. Alternatively the scattering sections 46 can have an arbitrary nonuniform extension a. At least one horizontally scattered partial additional light beam is reflected by each convex scattering section 46. The angle between the most strongly scattered light rays is indicated with $\alpha$ in FIG. 4. The light rays of the partial additional light beams reflected by the convex scattered sections 46 overlap each other and form together the additional light beam issuing from the headlight, which as described above illuminates the region 82 and/or the region 87 and/or the region 85 and 86 of the measuring screen 70.

Figure 5:
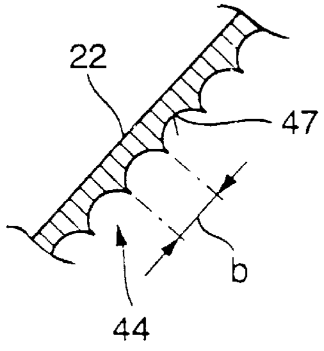
FIG. 5 is a detailed cross-sectional view of a portion of the additional reflector from the apparatus of FIG. 4 in a first modification of the embodiment.

Another embodiment with modified scattering sections 47 of the reflective surface 44 of the additional reflector 22 is shown in cross-section in FIG. 5. The scattering sections are formed as concave depressions with spherical or nonspherical curvature in the reflective surface 44. The extension b of the concave scattering section 47 can be a constant or can vary over the entire reflection surface 44. Also in this embodiment the partial additional light beams scattered horizontally by the concave scattering sections 47, which overlap to form the additional light beam issuing from the headlight, are reflected.

Figure 6:
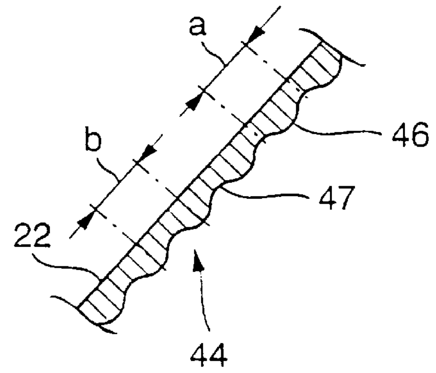
FIG. 6 is a detailed cross-sectional view of the portion of the additional reflector in a second modification of the embodiment.

In an additional embodiment shown in FIG. 6 both the convex scattering sections 46 and the concave scattering sections 47 are arranged alternately one after the other next to each other. The extension a of the convex scattering section 46 and the extension b of the concave scattering sections 47 are the same or different. Also in this embodiment the partial additional light beams scattered by the scattering sections 47, which overlap to form the additional light beam propagated from the headlight, are reflected. The above-described embodiment of the additional reflector 22 according to FIGS. 4 to 6 is especially advantageous when the main reflector 10 with the lens 16 and the additional reflector 22 is arranged far inside a housing of the headlight in a direction opposite to the light propagation direction 14. In this case with the additional reflector 22 according to the first or second embodiments the reflected additional light beam could propagate still only partially from the headlight housing, while the additional light beam required by the action of the scattering sections of the modifications of FIGS. 4 to 6 has a sufficient horizontal scattering and issues from the headlight housing.

Figure 7:
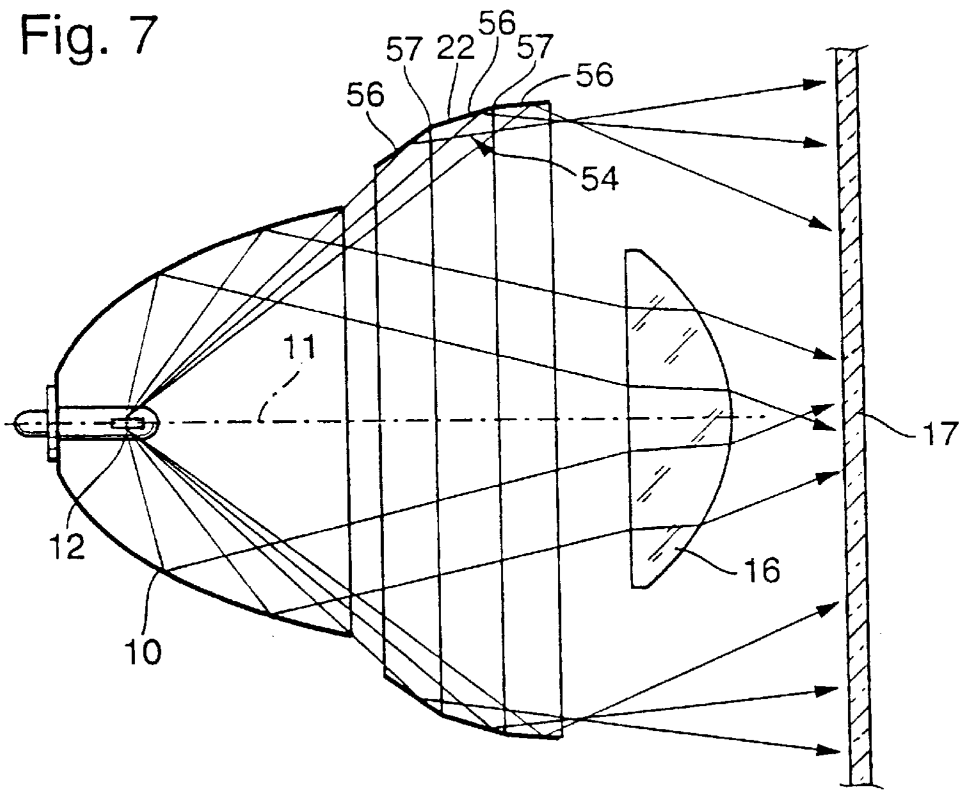
FIG. 7 is a diagrammatic horizontal longitudinal cross-sectional view through a headlight according to a fourth embodiment of the invention.
Figure 8:
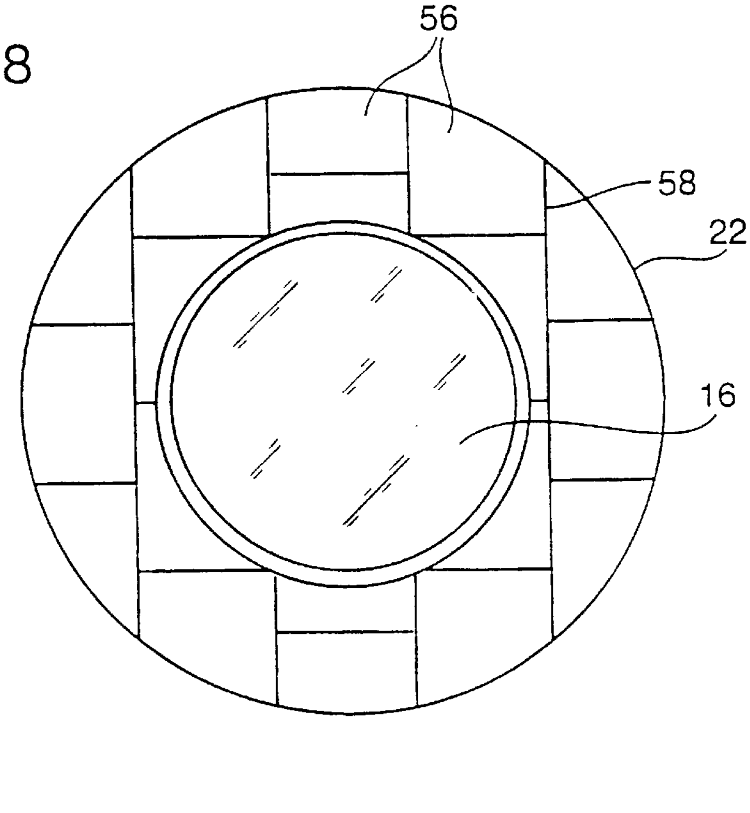
FIG. 8 is a front view of the headlight of FIG. 7.

An additional reflector 22 according to a fourth embodiment of the invention is illustrated in FIGS. 7 and 8. In this embodiment its reflective surface 54 provided with a reflective coating is divided into a plurality of facets 56, which border each other at a discontinuity or step 57. The facets 56 can be concave, convex or flat. Also a combination of different shapes is possible, which means that some of the facets are curved but others are flat. The separating lines 58 between the facets 56 can be straight as shown in FIG. 8 or can be any other form according to choice. A partial additional light beam is reflected by each facet 56 in this embodiment and these partial additional light beams reflected from the respective facets together overlap to form the additional light beam propagated from the headlight. It can be provided that partial additional light beams reflected by a portion of the facets 56 illuminate the regions 82 and/or the regions 85,86 and partial additional light beams reflected by another part of the facets 56 illuminate the regions 87 of the measuring screen 70.

Figure 9:
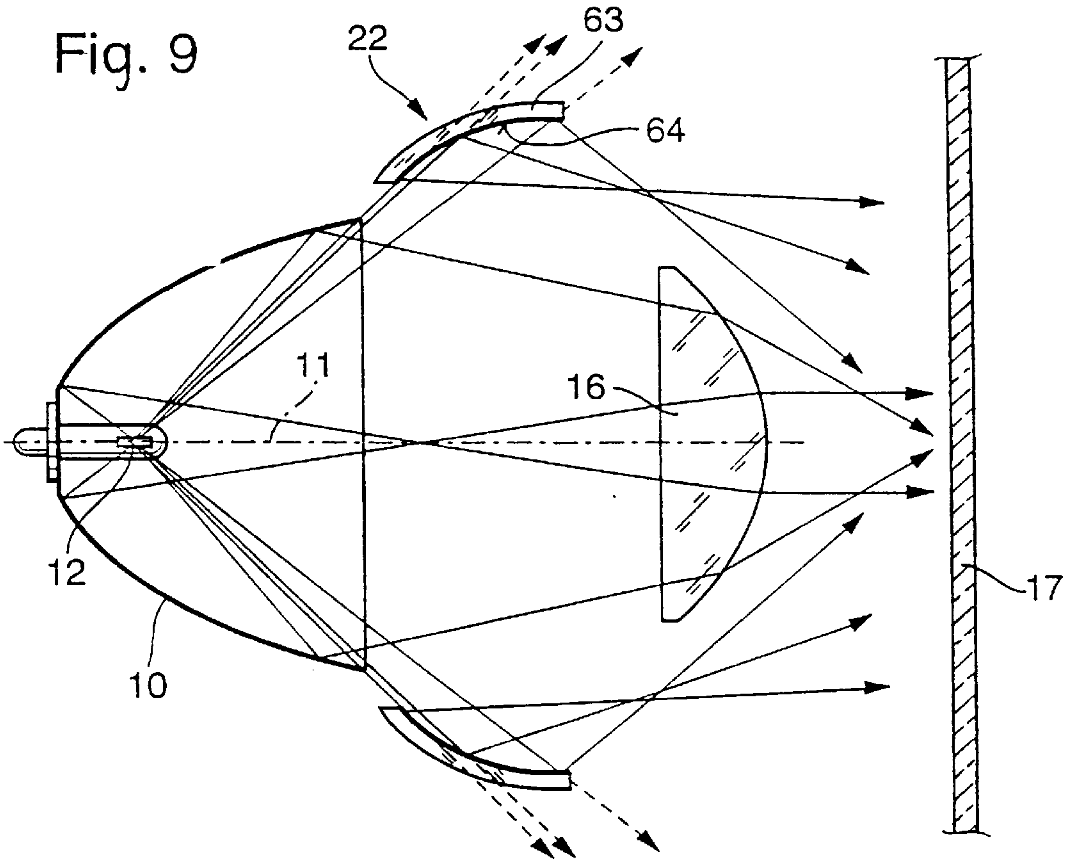
FIG. 9 is a diagrammatic horizontal longitudinal cross-sectional view through a headlight according to a fifth embodiment of the invention.

The additional reflector 22 according to a fifth embodiment is shown in FIG. 9. The additional reflector 22 has a base body 63 made from an at least partially light permeable material, on which a reflective coating 64 is applied to form a reflective surface. The coating 64 is preferably applied to the inner surface of the base body 63 facing the optic axis 11. The coating 64 has a reduced degree of reflection, so that only a portion of the light falling on the coating 64 from the light source 12 is reflected. The degree of reflection is defined as the ratio of the reflected light to the incident light. The degree of reflection of the coating 64 is less than that of the reflective coating of the main reflector 10 and amounts to, for example, less than 0.9. The coating 64 also is partially light permeable, so that a part of the light falling on it passes through it and is not reflected. The degree of light permeability of the coating 64 can, for example, be determined by its thickness and/or by the material used for it. A portion of the light from the light source 12 reflected by the coating 64 is such that the additional light beam has the required light intensity values when the degree of reflection and the permeability of the coating 64 are suitably chosen. Because of the partial permeability and reduced reflection degree of the reflective coating 64, an excessive light intensity of the additional light beam and/or too high a light density at the reflecting surface of the additional reflector can be avoided, especially when a gas discharge lamp is used as light source 12, which has a comparatively large light flux output. Thus blinding of the driver of an on-coming vehicle can be avoided. The form and shape of the reflector surface of the additional reflector can thus be selected according to one of the previously described examples.

A reduced degree of reflection of the reflection surface of the additional reflector can be achieved by making the reflective coating somewhat rough or coarse instead of highly polished or smooth. The degree of reflection of the additional reflector 22 can be attained by a suitable roughening or grinding so that the illumination intensity values of the additional light beam reflected by the additional reflector 22 do not exceed the required illumination intensity values. A reflection degree of about 0.9 to 0.95 can be achieved with a highly polished coating, as in the main reflector 10 and a reflection degree of less than 0.9 can be achieved by roughening this surface. A reflection degree of the reflective coating of the additional main reflector 10 reduced in this way can be provided in all the previously described embodiments.

The disclosure of German Patent Application 197 04 467.0 of Feb. 6, 1997 is hereby explicitly incorporated by reference. This German Patent Application discloses the same invention as described herein and claimed in the claims appended hereinbelow and is the basis for a claim of priority for the instant invention under 35 U.S.C. 119.

While the invention has been illustrated and described as embodied in a headlight for a vehicle, especially a motor vehicle, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

I claim:

1. A headlight for a vehicle, said headlight comprising a light source (12) for producing light; a main reflector (10), by which one portion of the light issuing from the light source (12) is reflected as a convergent light beam; a lens (16) arranged so that the convergent light beam passes through the lens; at least one additional reflector (22) arranged between the main reflector (10) and the lens (16), said at least one additional reflector arranged to extend around at least a portion of a circumference of the main reflector and shaped so that another portion of the light from the light source (12) not captured by the main reflector (10) is reflected by the at least one additional reflector (22) to form at least one additional light beam which does not pass through the lens (16) and which is propagated from the light source (12) with horizontal scattering; and a light permeable cover disk (17) covering a light outlet opening of the headlight and having no optical elements.

2. The headlight as defined in claim 1, wherein the at least one additional reflector (22) extends completely around the circumference of the main reflector (10).

3. The headlight as defined in claim 1, wherein the at least one additional light beam reflected by the at least one additional reflector (22) is convergent.

4. The headlight as defined in claim 1, wherein the at least one additional light beam reflected by the at least one additional reflector (22) is divergent.

5. The headlight as defined in claim 1, wherein the at least one additional reflector (22) is shaped and arranged so that at least one partial additional light beam of the at least one additional light beam passes under a light-dark boundary defining an upper edge of the convergent light beam passing through the lens.

6. The headlight as defined in claim 1, wherein the at least one additional reflector (22) is shaped and arranged so that at least one partial additional light beam of the at least one additional light beam passes above a light-dark boundary of the convergent light beam passing through the lens.

7. The headlight as defined in claim 1, wherein the at least one additional reflector (22) has a reflective surface (44) provided with scattering sections (46;47) by which said another portion of light falling thereon is horizontally scattered.

8. The headlight as defined in claim 1, wherein the at least one additional reflector (22) has a reflection surface (54) is divided into a plurality of facets (56) corresponding to regions of said reflection surface (54).

9. The headlight as defined in claim 1, wherein the at least one additional reflector (22) has a reflection degree which is less than that of the main reflector (10).

10. The headlight as defined in claim 9, wherein said reflection degree is less than 0.9.

11. The headlight as defined in claim 1, wherein the at least one additional reflector (22) has a base body (63) made at least partially of light permeable material, on which a partially reflective coating (64) is provided, said partially reflective coating (64) being reflecting to a predetermined degree and light permeable to a predetermined degree.

* * * * *